(12) United States Patent
Inoue et al.

(10) Patent No.: US 9,279,355 B2
(45) Date of Patent: Mar. 8, 2016

(54) UREA SOLUTION INJECTION NOZZLE

(71) Applicants: YANMAR CO., LTD., Osaka-shi, Osaka (JP); JAPAN SHIPS MACHINERY & EQUIPMENT ASSOCIATION, Minato-ku, Tokyo (JP)

(72) Inventors: Tsuyoshi Inoue, Osaka (JP); Ryoji Murashima, Seto (JP)

(73) Assignees: YANMAR CO., LTD. (JP); JAPAN SHIP MACHINERY & EQUIPMENT ASSOCIATION (JP)

( * ) Notice: Subject to any disclaimer, the term of this patent is extended or adjusted under 35 U.S.C. 154(b) by 0 days.

(21) Appl. No.: 14/409,266

(22) PCT Filed: Jun. 17, 2013

(86) PCT No.: PCT/JP2013/066599
§ 371 (c)(1),
(2) Date: Dec. 18, 2014

(87) PCT Pub. No.: WO2013/191134
PCT Pub. Date: Dec. 27, 2013

(65) Prior Publication Data
US 2015/0167524 A1 Jun. 18, 2015

(30) Foreign Application Priority Data
Jun. 21, 2012 (JP) ................. 2012-140013

(51) Int. Cl.
*F01N 3/00* (2006.01)
*F01N 3/20* (2006.01)
(Continued)

(52) U.S. Cl.
CPC ................ *F01N 3/208* (2013.01); *B05B 7/267* (2013.01); *F01N 3/2066* (2013.01); *F01N 3/2896* (2013.01); *F01N 2610/02* (2013.01); *F01N 2610/08* (2013.01); *F01N 2610/1453* (2013.01); *Y02T 10/24* (2013.01)

(58) Field of Classification Search
CPC ....... F01N 3/2896; F01N 3/08; F01N 3/2066; F01N 3/208; B05B 7/267; B01D 53/94
USPC .......................................................... 60/295
See application file for complete search history.

(56) References Cited

FOREIGN PATENT DOCUMENTS

EP        2314837 A1    4/2011
JP      2004360578 A   12/2004
(Continued)

OTHER PUBLICATIONS

English translation of Japanese Patent Application Publication No. JP 2008019773A (Jan. 2008).*
(Continued)

*Primary Examiner* — Jason Shanske
(74) *Attorney, Agent, or Firm* — Cantor Colburn LLP

(57) ABSTRACT

The purpose of the present invention is to provide a urea solution injection nozzle in which deposition and growth of urea on the surface of the urea solution injection nozzle are minimized. A urea solution injection nozzle is provided with urea solution flow paths and gas flow paths. A mixture of urea solution and gas are injected from an injection port. A slit that is a side-surface discharge port is configured so that gas is discharged along a curved surface on the outer surface of the urea solution injection nozzle in the same direction as the injection direction of the urea solution. The slit and the flow path are connected by a branching flow path.

8 Claims, 4 Drawing Sheets

(51) Int. Cl.
*B05B 7/26* (2006.01)
*F01N 3/28* (2006.01)

(56) References Cited

FOREIGN PATENT DOCUMENTS

| | | | | |
|---|---|---|---|---|
| JP | 2008019773 | A | * | 1/2008 |
| JP | 2009041502 | A | * | 2/2009 |
| JP | 2009045511 | A | | 3/2009 |
| JP | 2011080437 | A | * | 4/2011 |

OTHER PUBLICATIONS

English translation of Japanese Patent Application Publicaation No. JP 2009041502A (Feb. 2009).*

English translation of Japanese Patent Application Publication No. JP 2011080437A (Apr. 2011).*

International Search Report corresponding to Application No. PCT/JP2013/066599; Date of Mailing: Aug. 20, 2013, with English translation.

* cited by examiner

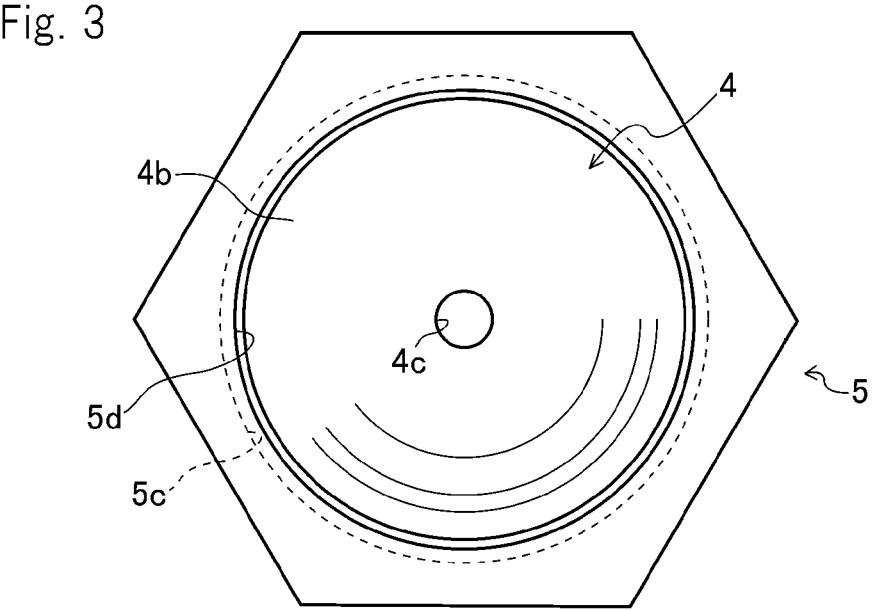
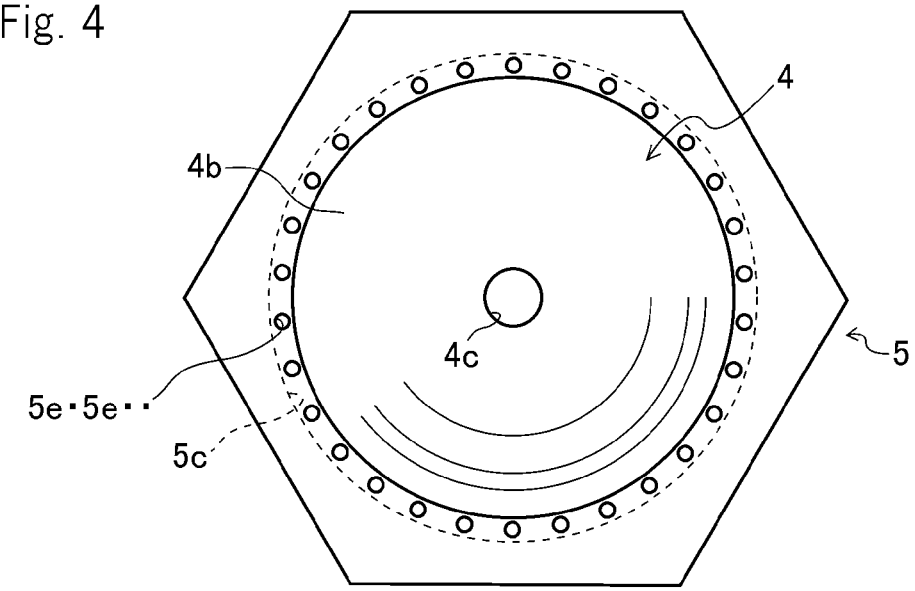

Fig. 5
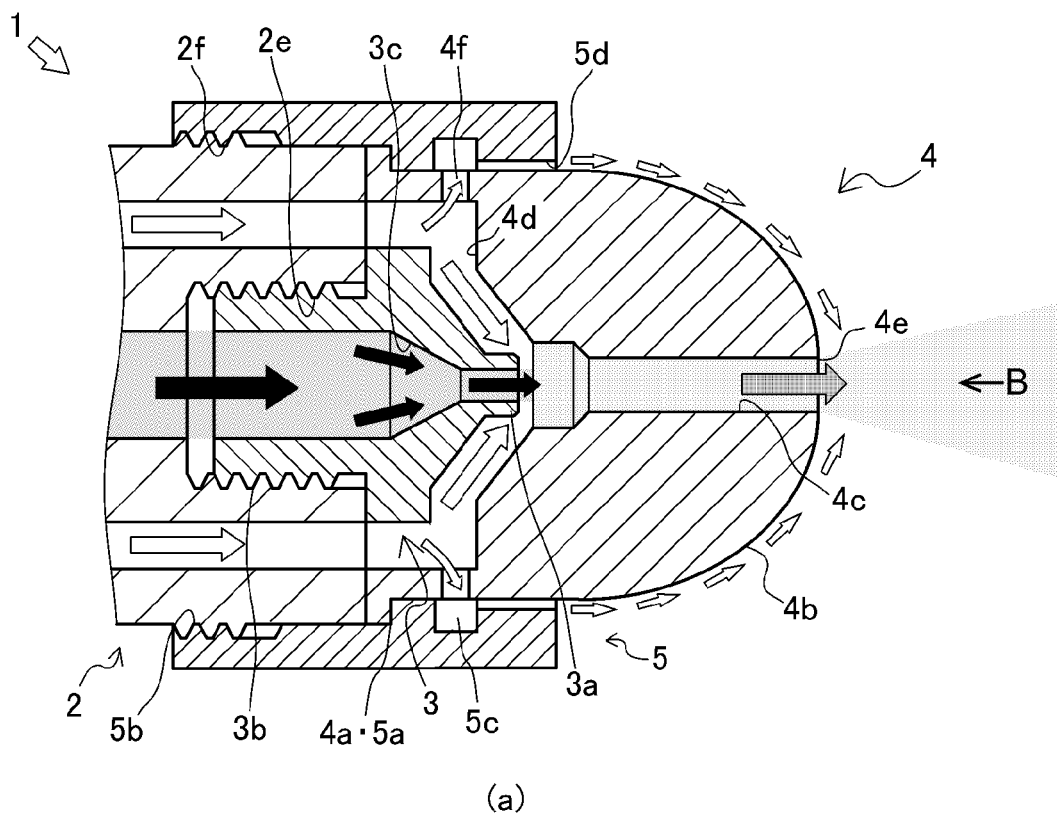
(a)
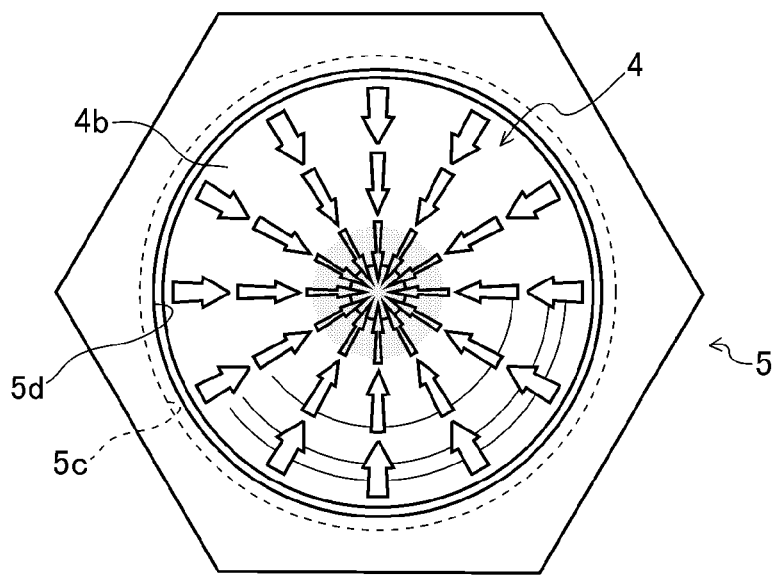
(b)

UREA SOLUTION INJECTION NOZZLE

This is the U.S. national stage of application No. PCT/JP2013/66599, filed on Jun. 17, 2013. Priority under 35 U.S.C. §119(a) and 35 U.S.C. §365(b) is claimed from Japanese Application No. 2012-140013, filed Jun. 21, 2012, the disclosure of which is also incorporated herein by reference.

TECHNICAL FIELD

The present invention relates to a urea solution injection nozzle. Especially, the present invention relates to the urea solution injection nozzle in an exhaust purification apparatus for a ship.

BACKGROUND ART

Conventionally, an exhaust purification apparatus is known in which a selective reducing type NOx catalyst (SCR catalyst) is disposed inside an exhaust pipe and NOx (nitrogen oxide) is reduced into nitrogen and water with ammonia as a reducing agent for decreasing the NOx in exhaust gas discharged from an internal combustion engine. For example, it is like the Patent Literature 1.

In an exhaust purification apparatus described in the Patent Literature 1, a urea solution is supplied from a urea solution injection nozzle arranged inside an exhaust pipe to exhaust gas, and ammonia is generated from the urea solution by heat of the exhaust gas so as to reduce NOx into nitrogen and water. However, there is a problem in that water of the urea solution remaining in a surface of the urea solution injection nozzle evaporates with the heat of the exhaust gas so that urea deposits and grows, thereby closing the exhaust pipe.

On the other hand, a two-fluid mixing type nozzle such as the urea solution injection nozzle is known in that pressurized air for atomizing medicinal liquid (coating liquid) is mixed with the coating liquid while being discharged to a tip of the nozzle so as to prevent the coating liquid from adhering to the tip of the nozzle and becoming a lump. For example, it is like the Patent Literature 2.

However, the nozzle described in the Patent Literature 2 prevents the coating liquid from adhering to the tip of the nozzle. In the case of injecting the urea solution upward like a urea solution injection nozzle in an exhaust purification apparatus for a ship, the urea solution adheres to the whole nozzle. Accordingly, when the art disclosed in the Patent Literature 1 is used, it is disadvantageous that deposition and growth of the urea cannot be prevented effectively.

PRIOR ART REFERENCE

Patent Literature

Patent Literature 1: the Japanese Patent Laid Open Gazette 2004-360578
Patent Literature 2: the Japanese Patent Laid Open Gazette 2009-045511

DISCLOSURE OF INVENTION

Problems to be Solved by the Invention

The present invention is provided in consideration of the problems as mentioned above, and the purpose of the invention is to provide a urea solution injection nozzle which suppresses deposition and growth of urea on a surface of the urea solution injection nozzle.

Means for Solving the Problems

The problems to be solved by the present invention have been described above, and subsequently, the means of solving the problems will be described below.

According to the present invention, in a urea solution injection nozzle in which a urea solution flow path and a gas flow path are configured and a urea solution and gas are mixed and then injected from an injection port, a side surface discharge port is configured so that the gas is discharged along an outer surface of the urea solution injection nozzle in the same direction as an injection direction of the urea solution, and the side surface discharge port is communicated with the gas flow path by a branching flow path.

According to the present invention, the outer surface is formed so that the shorter a distance to the injection port becomes, the shorter a distance from the flow path of the gas and the urea solution becomes within a predetermined range from the injection port.

According to the present invention, the side surface discharge port is configured by a slit configured along the outer surface so as to surround the urea solution injection nozzle.

According to the present invention, a space in which the gas is retained is configured so as to surround the urea solution injection nozzle, and the branching flow path and the side surface discharge port are communicated with the space.

Effect of the Invention

The present invention brings the following effects.

According to the present invention, the urea solution adhering to the outer surface of the urea solution injection nozzle can be blown away by the gas for injecting the urea solution. Accordingly, deposition and growth of the urea on the surface of the urea solution injection nozzle can be suppressed.

According to the present invention, the urea solution adhering to the outer surface between the side surface discharge port of the urea solution injection nozzle and the injection port can be blown away. Accordingly, deposition and growth of the urea on the surface of the urea solution injection nozzle can be suppressed.

According to the present invention, the urea solution adhering to the whole side surface of the urea solution injection nozzle can be blown away. Accordingly, deposition and growth of the urea on the surface of the urea solution injection nozzle can be suppressed.

According to the present invention, the pressure of the gas discharged from the side surface discharge port is made uniform, and the urea solution adhering to the whole side surface of the urea solution injection nozzle can be blown away uniformly. Accordingly, deposition and growth of the urea on the surface of the urea solution injection nozzle can be suppressed.

BRIEF DESCRIPTION OF DRAWINGS

FIG. 3 is a drawing of the urea solution injection nozzle viewed from a direction of an arrow A in FIG. 2.

FIG. 4 is a drawing of another embodiment of the urea solution injection nozzle viewed from a direction of the arrow A in FIG. 2.

FIG. 5(a) is a drawing of the state in which a urea solution is supplied to an inside of an exhaust pipe from the urea solution injection nozzle of the exhaust purification apparatus according to the embodiment of the present invention. FIG. 5(b) is a drawing of the urea solution injection nozzle viewed from a direction of an arrow B in FIG. 5(a).

DETAILED DESCRIPTION OF THE INVENTION

An explanation will be given on an exhaust purification apparatus 100 according to an embodiment of the present invention referring to FIGS. 1 and 2. In this embodiment, an "upstream side" means an upstream side in a flow direction of fluid, and a "downstream side" means a downstream side in the flow direction of the fluid.

Figure 1:
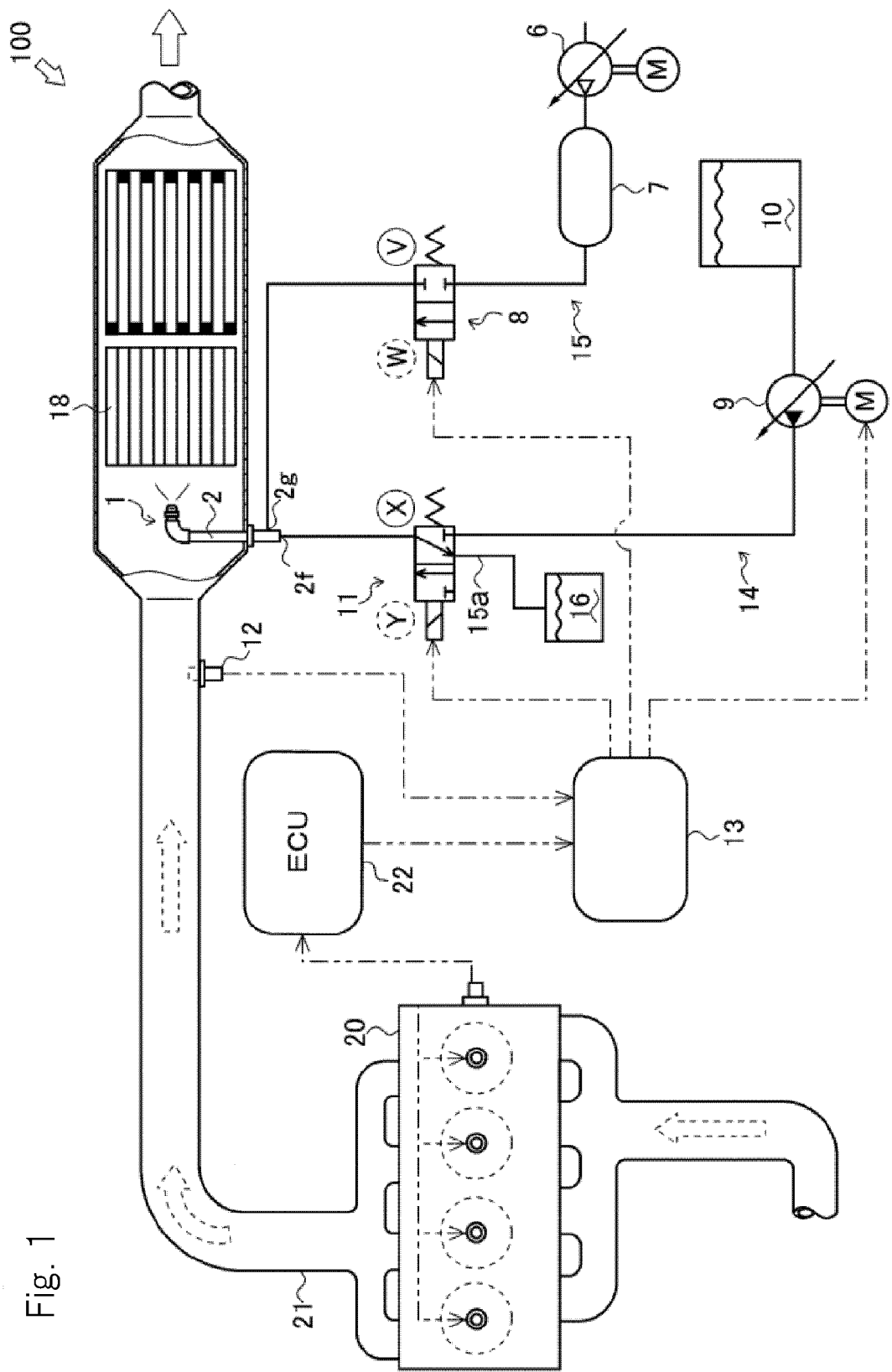
FIG. 1 is a drawing of an exhaust purification apparatus according to an embodiment of the present invention.

As shown in FIG. 1, the exhaust purification apparatus 100 purifies exhaust gas discharged from an engine 20. The exhaust purification apparatus 100 is provided in an exhaust pipe 21 of the engine 20. The exhaust purification apparatus 100 has a urea solution injection nozzle 1, a pressurized air supply pump (compressor) 6, a pressurized air valve 8, a urea solution supply pump 9, a switching valve 11, a NOx detection part 12, a control part 13, a first supply flow path 14, a second supply flow path 15, a NOx catalyst 18 and the like.

The urea solution injection nozzle 1 supplies a urea solution to an inside of the exhaust pipe 21. The urea solution injection nozzle 1 includes a tubular member, and one of sides (lower side) thereof is inserted into the inside of the exhaust pipe 21 from the outside. The urea solution injection nozzle 1 has a double pipe 2, a liquid nozzle 3, an air nozzle 4, a nut 5 and the like (see FIG. 2).

The pressurized air supply pump (compressor) 6 supplies pressurized air to an air tank 7. The pressurized air supply pump 6 pressurizes (compresses) air and supplies the air. The pressurized air supply pump 6 supplies the air to the air tank 7 when a pressure of the air tank 7 becomes lower than a predetermined pressure, and stops when the pressure of the air tank 7 reaches the predetermined pressure. In this embodiment, the pressurized air supply pump 6 is not limited and may be a member which can maintain the pressure of the air tank 7.

The pressurized air valve 8 opens and closes a flow path of the pressurized air. The pressurized air valve 8 is provided in the second supply flow path 15. The pressurized air valve 8 includes an electromagnetic valve and a solenoid thereof is connected to the control part 13. The pressurized air valve 8 can be switched to a position V and a position W by sliding a spool. When the pressurized air valve 8 is at the position V, the second supply flow path 15 is closed. Then, the pressurized air is not supplied to the urea solution injection nozzle 1. When the pressurized air valve 8 is at the position W, the second supply flow path 15 is opened. Then, the pressurized air is supplied to the urea solution injection nozzle 1. Though the pressurized air valve 8 includes the electromagnetic valve, the pressurized air valve 8 is not limited thereto and may alternatively be held at the position V or the position W by a driving motor or the like.

The urea solution supply pump 9 supplies a urea solution. The urea solution supply pump 9 is provided in the first supply flow path 14. The urea solution supply pump 9 supplies the urea solution in a urea solution tank 10 via the first supply flow path 14 to the urea solution injection nozzle 1 at a predetermined flow rate. In this embodiment, the urea solution supply pump 9 is not limited and may be a member which can supply the urea solution at the predetermined flow rate.

The switching valve 11 switches a flow path of the urea solution. The switching valve 11 is provided at the downstream side of the urea solution supply pump 9 in the first supply flow path 14. A drain pot 16 is connected via a flow path 15a to the switching valve 11. The switching valve 11 includes an electromagnetic valve and a solenoid thereof is connected to the control part 13. The switching valve 11 can be switched to a position X and a position Y by sliding a spool.

When the switching valve 11 is at the position X, the first supply flow path 14 is closed and the urea solution injection nozzle 1 is communicated with the drain pot 16. Then, the urea solution is not supplied to the urea solution injection nozzle 1, and the supplied urea solution in the first supply flow path 14 and the urea solution injection nozzle 1 at the downstream side of the switching valve 11 is discharged to the drain pot 16.

When the switching valve 11 is at the position Y, the first supply flow path 14 is opened. Then, the urea solution is supplied to the urea solution injection nozzle 1.

The NOx detection part 12 detects a discharge amount of NOx included in the exhaust gas of the engine 20. The NOx detection part 12 includes a NOx sensor and the like and arranged in the middle of the exhaust pipe 21 and at the upstream side of the NOx catalyst 18. In this embodiment, the position and number of the NOx sensor is not limited and the configuration may be able to detect suitably the NOx discharge amount.

The control part 13 controls the urea solution supply pump 9, the switching valve 11, the pressurized air valve 8 and the like. Various programs and data for controlling the urea solution supply pump 9, the switching valve 11, the pressurized air valve 8 and the like are stored in the control part 13. The control part 13 may be configured by connecting a CPU, a ROM, a RAM, a HDD and the like by a bus, or may alternatively be configured by a one-chip LSI or the like. The control part 13 may be configured integrally with an ECU 22 which controls the engine 20.

The control part 13 is connected to the ECU 22, the pressurized air valve 8, the urea solution supply pump 9, and the switching valve 11.

The control part 13 can obtain various kinds of information about the engine 20 from the ECU 22. The control part 13 is connected to the NOx detection part 12 and can obtain the NOx discharge amount detected by the NOx detection part 12. The control part 13 can control the pressurized air valve 8, the urea solution supply pump 9, and the switching valve 11.

The NOx catalyst 18 promotes deoxidization reaction of NOx. The NOx catalyst 18 is arranged inside the exhaust pipe 21 and at the downstream side of the urea solution injection nozzle 1. The NOx catalyst 18 is configured honeycomb like and promotes reaction that ammonia generated by thermal hydrolysis of the urea solution reduces NOx included in the exhaust gas into nitrogen and water.

Next, an explanation will be given on the urea solution injection nozzle 1 of internal mixing type concretely referring to FIGS. 2 and 3. The type of the urea solution injection nozzle 1 is not limited to this embodiment and an external mixing type urea solution injection nozzle may alternatively be used.

Figure 2:
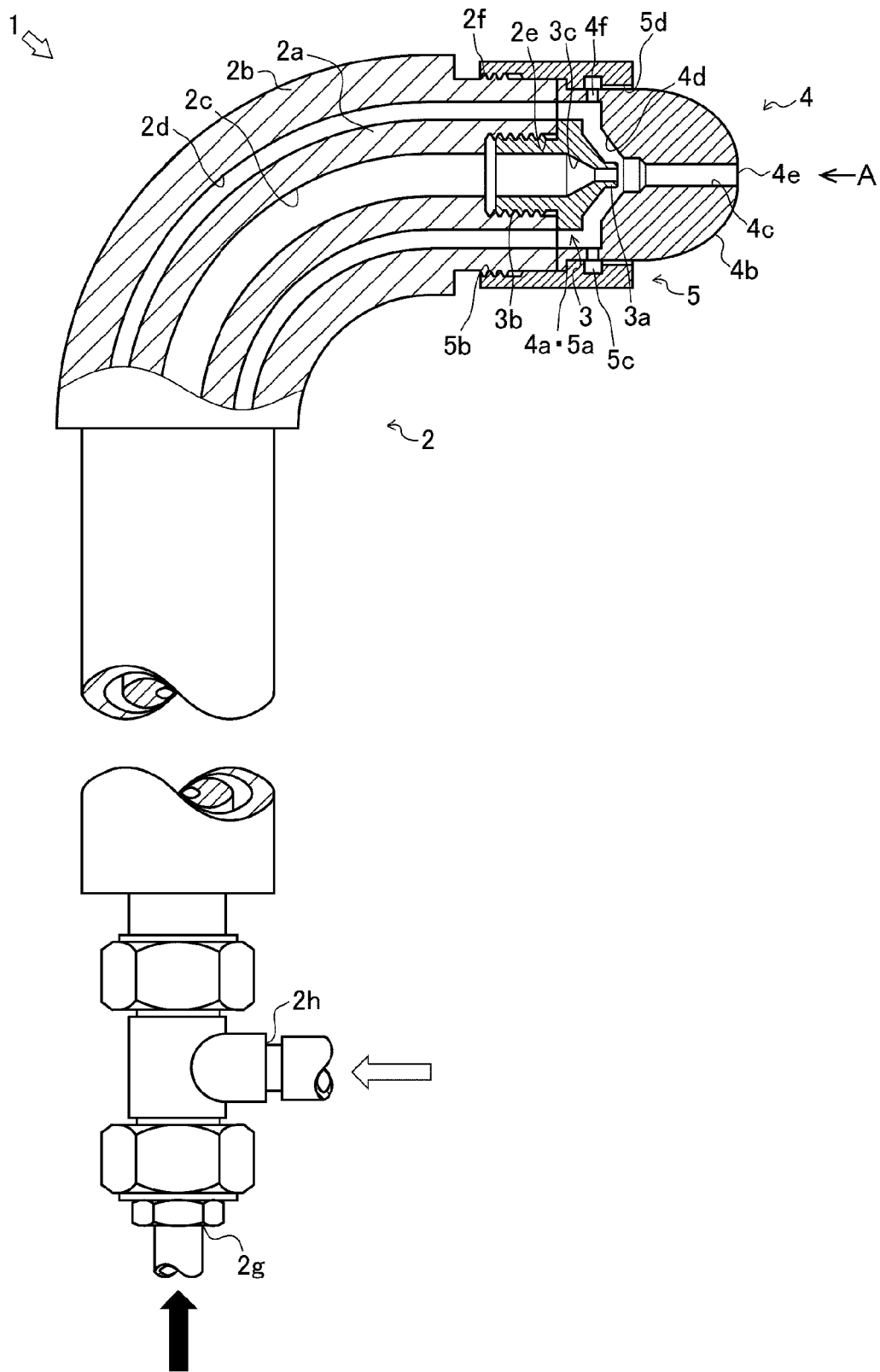
FIG. 2 is a drawing partially in section of a urea solution injection nozzle of the exhaust purification apparatus according to the embodiment of the present invention.

As shown in FIG. 2, the urea solution injection nozzle 1 has the double pipe 2, the liquid nozzle 3, the air nozzle 4, and the nut 5.

The double pipe 2 is a main component of the urea solution injection nozzle 1 and constitutes the flow path of the urea solution and the flow path of the pressurized air. One of sides of the double pipe 2 is arranged inside the exhaust pipe 21 and the other side (upstream side) thereof is arranged outside the exhaust pipe 21. The downstream end of the double pipe 2 is arranged upstream the NOx catalyst 18 arranged inside the exhaust pipe 21.

The double pipe 2 includes an outer pipe 2b and an inner pipe 2a arranged inside the outer pipe 2b. A urea solution flow path 2c which is a flow path of the urea solution is configured in the inner pipe 2a. A gas flow path 2d which is a flow path of the pressurized air is configured in a space between the inner pipe 2a and the outer pipe 2b. In a middle part of an outer side of the outer pipe 2b, a connection part (not shown) which can be connected watertightly to the exhaust pipe 21 is configured. In downstream ends of the inner pipe 2a and the outer pipe 2b, a female screw part 2e and a male screw part 2f are formed respectively. In an upstream end of the double pipe 2, a urea solution supply port 2g communicated with the urea solution flow path 2c and a gas supply port 2h communicated with the gas flow path 2d are configured.

The liquid nozzle 3 injects the urea solution. The liquid nozzle 3 is formed by a substantially cylindrical member and arranged downstream the double pipe 2. One of ends (downstream end) of the liquid nozzle 3 is formed conically around the axis. At a center of the end, a projection part 3a which is substantially cylindrical is formed so as to be projected axially. In the other end (upstream end) of the liquid nozzle 3, a male screw part 3b is formed so as to be projected axially. Furthermore, in an axial center part of the liquid nozzle 3, a urea solution flow path 3c is formed so as to penetrate axially the whole liquid nozzle 3 from the male screw part 3b to the projection part 3a. A middle part of the urea solution flow path 3c is contracted diametrically so that an inner diameter of a downstream end of the urea solution flow path 3c is formed smaller than an inner diameter of an upstream end of the urea solution flow path 3c.

The male screw part 3b of the liquid nozzle 3 is screwed to the female screw part 2e of the double pipe 2. Accordingly, the double pipe 2 is connected to the liquid nozzle 3 and the urea solution flow path 3c is communicated with the urea solution flow path 2c of the double pipe 2. Then, the urea solution can be supplied from the urea solution flow path 2c of the double pipe 2 to the urea solution flow path 3c.

The air nozzle 4 injects the urea solution which is atomized. The air nozzle 4 is formed by a substantially cylindrical member. The air nozzle 4 is arranged downstream the liquid nozzle 3 so that one of ends (upstream end) of the air nozzle 4 touches the downstream end of the double pipe 2. In an axial part of the air nozzle 4, a hole which has a substantially conical diametrical contracted part contracted diametrically from a middle part toward the other side (downstream side) is formed penetratingly from the upstream end to the downstream end. An inner diameter of an upstream end of the hole is formed enough for the pressurized air to pass therethrough even if a downstream end of the liquid nozzle 3 is inserted into the upstream end of the hole. In an axial center part of a diametrical contracted side end of the diametrical contracted part, a mixing flow path 4c of the urea solution is formed. In a downstream end of the air nozzle 4, an injection port 4e which is an opening of the mixing flow path 4c is formed.

In a side surface of the upstream end of the air nozzle 4, a flange part 4a is formed. A side surface of the downstream side of the air nozzle 4 is shaped shell-like while a peak of the shell is the injection port 4e. Namely, in the side surface of the downstream side of the air nozzle 4, a curved surface 4b is formed in which the shorter a distance to the injection port 4e becomes, the shorter a distance from the mixing flow path 4c becomes within a predetermined range from the injection port 4e. Though the side surface of the downstream side of the air nozzle 4 is shaped shell-like in this embodiment, the shape is not limited thereto and may alternatively be conical or truncated cone-like.

The air nozzle 4 is connected to the double pipe 2 by the nut 5. The downstream end of the liquid nozzle 3 is inserted into the hole of the upstream side of the air nozzle 4. At this time, a space is formed between the hole of the air nozzle 4 and the liquid nozzle 3. The space is communicated as a gas flow path 4d with the gas flow path 2d of the double pipe 2 and the mixing flow path 4c. Accordingly, the urea solution is supplied from the urea solution flow path 3c of the liquid nozzle 3 to the mixing flow path 4c, and the pressurized air is supplied from the gas flow path 4d to the mixing flow path 4c. Namely, the injection port 4e can inject the urea solution by screwing the air nozzle 4 to the double pipe 2.

One or more branching flow paths 4f is formed so as to be communicated with the hole of the air nozzle 4 from a side surface of the air nozzle 4. Namely, the branching flow paths 4f are formed so as to be communicated with the gas flow path 4d via a side surface of the air nozzle 4. When the pressurized air is supplied to the gas flow path 4d, a part of the pressurized air is discharged via the branching flow paths 4f to the side surface of the air nozzle 4. The number and inner diameter of the branching flow paths 4f are determined corresponding to the amount of the pressurized air discharged to the side surface of the air nozzle 4.

The nut 5 fastens the double pipe 2 to the air nozzle 4. In an inner perimeter of the nut 5, a stepped part 5a which is engaged with the flange part 4a of the air nozzle 4 is formed. In an upstream side of the stepped part 5a, a female screw part 5b which is screwed to the male screw part 2f of the double pipe 2 is formed. An inner diameter of downstream side of the stepped part 5a is set enough large for the air nozzle 4 to be inserted into the downstream side of the stepped part 5a. A diametrical expanded part is formed in a part opposite to the branching flow paths 4f of the air nozzle 4 in the downstream side of the stepped part 5a. An inner diameter of a downstream side of the diametrical expanded part is formed slightly larger than an outer diameter of the air nozzle 4.

The nut 5 is fixed by fastening the female screw part 5b to the male screw part 2f of the double pipe 2 so that the stepped part 5a is engaged with the flange part 4a of the air nozzle 4. Accordingly, the upstream end of the air nozzle 4 is fixed while contacting closely the downstream end of the double pipe 2. At this time, the diametrical expanded part of the nut 5 and the side surface of the air nozzle 4 constitute a space 5c in which the gas is retained. Accordingly, the pressurized air can be supplied to the space 5c via the branching flow paths 4f of the air nozzle 4.

As shown in FIGS. 2 and 3, a slit 5d is configured downstream the space 5c and between the nut 5 and the air nozzle 4. Namely, the slit 5d is configured along the side surface of the air nozzle 4 so as to surround the air nozzle 4. Furthermore, the slit 5d is communicated with the space 5c. Namely, the pressurized air supplied to the space 5c is discharged from the slit 5d along the side surface of the air nozzle 4 toward the downstream side of the space 5c, that is, along the same direction as the injection of the urea solution. Accordingly, in the side surface of the air nozzle 4, the slit 5d which is a side surface discharge port, via which the pressurized air is discharged, is configured. Though the side surface discharge port is configured by the slit 5d, the side surface discharge port is not limited thereto. For example, as shown in FIG. 4, the side surface discharge port may alternatively be configured by a plurality of holes 5e.

According to the above, the urea solution injection nozzle 1 has the liquid nozzle 3 which injects the urea solution toward one of the sides (downstream side) and the air nozzle 4, and injects the urea solution toward the NOx catalyst 18. In this embodiment, in the urea solution injection nozzle 1, the urea solution flow path 3c, the gas flow path 4d, and the mixing flow path 4c are configured by the liquid nozzle 3 and the air nozzle 4. However, the configuration is not limited thereto and the urea solution flow path 3c, the gas flow path 4d, and the mixing flow path 4c may be configured respectively.

An explanation will be given on an operation mode of the pressurized air valve 8 and the switching valve 11 referring to FIG. 1.

As shown in FIG. 1, the air tank 7 is connected to the gas supply port 2h of the urea solution injection nozzle 1 via the pressurized air valve 8 by the second supply flow path 15.

As mentioned above, normally, the pressurized air valve 8 is held at the position V. In this case, since the second supply flow path 15 is closed, the pressurized air is not supplied to the gas supply port 2h of the urea solution injection nozzle 1.

When the control part 13 energizes the solenoid of the pressurized air valve 8, the pressurized air valve 8 is switched from the position V to the position W. In this case, since the second supply flow path 15 is opened, the pressurized air is supplied to the gas supply port 2h of the urea solution injection nozzle 1.

When the control part 13 stops the energization to the solenoid of the pressurized air valve 8, the pressurized air valve 8 is switched to the position V. In this case, since the second supply flow path 15 is closed, the pressurized air is not supplied to the gas supply port 2h of the urea solution injection nozzle 1.

As shown in FIG. 1, the urea solution tank 10 is connected to the urea solution supply port 2g of the urea solution injection nozzle 1 via the urea solution supply pump 9 and the switching valve 11 by the first supply flow path 14.

As mentioned above, normally, the switching valve 11 is held at the position X. In this case, since the first supply flow path 14 is closed, the urea solution is not supplied to the urea solution supply port 2g of the urea solution injection nozzle 1. The urea solution supply port 2g of the urea solution injection nozzle 1 is atmosphere-opened in the drain pot 16 via the flow path 15a.

When the control part 13 energizes the solenoid of the switching valve 11, the switching valve 11 is switched to the position Y. In this case, since the first supply flow path 14 is opened, the urea solution is supplied to the urea solution supply port 2g of the urea solution injection nozzle 1. Since the communication with the drain pot 16 is cut off, the urea solution supply port 2g of the urea solution injection nozzle 1 is not atmosphere-opened.

When the control part 13 stops the energization to the solenoid of the switching valve 11, the switching valve 11 is switched to the position X. In this case, since the first supply flow path 14 is closed, the urea solution is not supplied to the urea solution supply port 2g of the urea solution injection nozzle 1. Since the communication with the drain pot 16 is permitted, the urea solution supply port 2g of the urea solution injection nozzle 1 is atmosphere-opened in the drain pot 16.

An explanation will be given on an operation mode of the urea solution injection nozzle 1 referring to FIGS. 1, 2 and 5.

As shown in FIG. 1, when the supply (injection) of the urea solution to the inside of the exhaust pipe 21 is started, the control part 13 switches the switching valve 11 to the position Y so that the urea solution is supplied to the urea solution supply port 2g of the urea solution injection nozzle 1 (the double pipe 2). As shown in FIGS. 2 and 5(a), the urea solution is injected at a predetermined pressure from the projection part 3a of the liquid nozzle 3 to the mixing flow path 4c of the air nozzle 4 via the urea solution flow path 2c of the double pipe 2 and the urea solution flow path 3c of the liquid nozzle 3 like a black arrow in FIG. 5(a).

In this state, as shown in FIG. 1, the control part 13 switches the pressurized air valve 8 to the position W so that the pressurized air is supplied to the gas supply port 2h of the urea solution injection nozzle 1 (the double pipe 2). As shown in FIGS. 2 and 5(a), the pressurized air is injected at a predetermined pressure via the gas flow path 2d of the double pipe 2 and the gas flow path 4d of the air nozzle 4 to the mixing flow path 4c of the air nozzle 4 like a void arrow in FIG. 5(a). As a result, the urea solution collides with the pressurized air inside the mixing flow path 4c of the air nozzle 4 and is atomized, and then injected via the injection port 4e of the air nozzle 4.

A part of the pressurized air supplied to the gas flow path 4d of the air nozzle 4 is supplied via the branching flow paths 4f to the space 5c. The pressurized air supplied to the space 5c is discharged from the slit 5d toward the downstream side of the air nozzle 4 (the side of the injection port 4e) at a uniform pressure. The pressurized air discharged from the slit 5d runs along the side surface of the air nozzle 4 so as to surround the air nozzle 4 by viscosity of the pressurized air. The pressurized air runs along the curved surface 4b which is the side surface of the air nozzle 4 shaped shell-like and then reaches the injection port 4e. Accordingly, when the urea solution injected from the injection port 4e approaches the side surface of the air nozzle 4, the urea solution is blown away by the pressurized air. The urea solution adhering to the surface of the air nozzle 4 is blown away by the pressurized air sequentially.

As shown in FIG. 1, when the supply (injection) of the urea solution to the inside of the exhaust pipe 21 is stopped, the control part 13 switches the switching valve 11 to the position X so that the supply of the urea solution to the urea solution supply port 2g of the urea solution injection nozzle 1 (the double pipe 2) is stopped. Accordingly, the urea solution supply port 2g of the double pipe 2 is atmosphere-opened via the first supply flow path 14 and the switching valve 11.

As the above, in the urea solution injection nozzle 1 according to this embodiment, the urea solution flow paths 2c and 3c and the gas flow paths 2d and 4d are configured, and the urea solution and the gas are mixed and then injected from the injection port 4e. The slit 5d which is the side surface discharge port is configured so that the gas is discharged along the curved surface 4b in the outer surface of the urea solution injection nozzle 1 in the same direction as the injection direction of the urea solution. The slit 5d is communicated with the gas flow path 4d by the branching flow path 4f.

According to the configuration, the urea solution adhering to the side surface of the urea solution injection nozzle 1 can be blown away by the gas for injecting the urea solution. Accordingly, deposition and growth of the urea on the surface of the urea solution injection nozzle 1 can be suppressed.

The curved surface 4b in the outer surface is formed in which the shorter the distance to the injection port 4e becomes, the shorter the distance from the mixing flow path 4c witch is the flow path of the gas and the urea solution becomes within the predetermined range from the injection port 4e.

According to the configuration, the urea solution adhering to the outer surface between the slit 5d which is the side surface discharge port of the urea solution injection nozzle 1 and the injection port 4e can be blown away. Accordingly, deposition and growth of the urea on the surface of the urea solution injection nozzle 1 can be suppressed.

The side surface discharge port is configured by the slit 5d configured along the curved surface 4b of the outer surface so as to surround the urea solution injection nozzle 1.

According to the configuration, the urea solution adhering to the whole side surface of the urea solution injection nozzle 1 can be blown away. Accordingly, deposition and growth of the urea on the surface of the urea solution injection nozzle 1 can be suppressed.

Furthermore, the space 5c in which the gas is retained is configured so as to surround the urea solution injection nozzle 1, and the branching flow paths 4f and the slit 5d which is the side surface discharge port are communicated with the space 5c.

According to the configuration, the pressure of the gas discharged from the slit 5d which is the side surface discharge port is made uniform, and the urea solution adhering to the whole side surface of the urea solution injection nozzle 1 can be blown away uniformly. Accordingly, deposition and growth of the urea on the surface of the urea solution injection nozzle can be suppressed.

INDUSTRIAL APPLICABILITY

The present invention can be used for a urea solution injection nozzle in an exhaust purification apparatus for a ship.

DESCRIPTION OF NOTATIONS 1 urea solution injection nozzle
2c urea solution flow path
3c urea solution flow path
2d gas flow path
4d gas flow path
4e injection port
4f branching flow path

The invention claimed is:

1. A urea solution injection nozzle, comprising:
a urea solution flow path;
a gas flow path surrounding the urea solution flow path;
a junction area joining the gas flow path to the urea solution flow path, so that gas flowing through the gas flow path is introduced into the junction area so as to be mixed with urea solution from the urea solution flow path;
an outer surface of the urea solution injection nozzle surrounding the urea solution flow path, the gas flow path, and the junction area;
an injection port provided on the outer surface and connected to the junction area so as to have the urea solution mixed with the gas injected therefrom;
a side surface discharge port provided on the outer surface so that the gas unmixed with the urea solution is discharged from the side surface discharge port in the same direction with the injection direction of the urea solution mixed with the gas from the injection port,
wherein the outer surface includes a portion extended from the side surface discharge port to the injection port, so that the gas unmixed with the urea solution and discharged from the side surface discharge port flows along the portion of the outer surface extended from the side surface discharge port to the injection port so as to reach the injection port; and
a branching flow path extended from the gas flow path to the side surface discharge port so as to supply the side surface discharge port with the gas unmixed with the urea solution.

2. The urea solution injection nozzle according to claim 1, further comprising:
a mixture flow path extended from the junction area to the injection port so as to have the urea solution mixed with the gas flowing therethrough, wherein the outer surface is formed so as to reduce its distance from the mixture flow path as it approaches the injection port.

3. The urea solution injection nozzle according to claim 2, wherein a slit serving as the side surface discharge port is provided along the outer surface so as to surround the urea solution injection nozzle.

4. The urea solution injection nozzle according to claim 3, wherein a space for accumulating the gas unmixed with the urea solution is configured so as to surround the urea solution injection nozzle, and wherein the branching flow path and the side surface discharge port are communicated with each other via the space.

5. The urea solution injection nozzle according to claim 1, further comprising:
a pipe member provided therein with the urea solution flow path and the gas flow path concentrically surrounding the urea solution flow path; and
a nozzle member connected to the inner pipe and the outer pipe,
wherein an outer surface of the nozzle member serves as the outer surface of the urea solution injection nozzle having the side surface discharge port and the injection port thereon, and
wherein the gas flow path, the junction area and the branching flow path are formed inside of the nozzle member.

6. The urea solution injection nozzle according to claim 5, wherein the outer surface of the nozzle member is formed in an ogive-like shape with a peripheral edge having the side surface discharge port thereon, and with a peaked point having the injection port thereon.

7. The urea solution injection nozzle according to claim 6, further comprising:
an annular member provided on the circular edge of the nozzle member so that a gap between the annular member and the nozzle member serves as the side surface discharge port.

8. The urea solution injection nozzle according to claim 7, wherein the annular member and the nozzle member also have a space therebetween so that the branching flow path and the side surface discharge port are communicated with each other via the space where the gas unmixed with the urea solution is accumulated.

* * * * *